United States Patent

[11] 3,609,152

[72] Inventors Hans-Jurgen E. Hess;
Gerald F. Holland, both of Groton, Conn.
[21] Appl. No. 7,347
[22] Filed Jan. 28, 1970
[45] Patented Sept. 28, 1971
[73] Assignee Pfizer Inc.
New York, N.Y.
Continuation of application Ser. No. 576,549, Sept. 1, 1966, now abandoned, which is a continuation-in-part of application Ser. No. 442,205, Mar. 23, 1965, now abandoned.

[54] CERTAIN 2-AMINO-3,4-DIHYDROGEN-INAZOLIN-4-ONES AND 4-THIONES
17 Claims, No Drawings

[52] U.S. Cl. .................................................. 260/256.5 R,
260/256.4 Q, 424/200, 424/251
[51] Int. Cl. ........................................................ C07d 51/48

[50] Field of Search ............................................ 260/256.4
Q, 256.5 R

[56] References Cited
UNITED STATES PATENTS

| | | | |
|---|---|---|---|
| 3,257,400 | 6/1966 | Wagner | 260/256.4 (Q) |
| 3,274,194 | 9/1966 | Hayao | 260/256.4 (Q) |
| 3,301,855 | 1/1967 | Blatter | 260/256.4 (Q) |
| 3,322,756 | 5/1967 | Ruschig et al. | 260/256.4 (Q) |

OTHER REFERENCES
Grout et al., J. Chem. Soc., 1960, pp. 3540–3545.
Postorskii et al., Zhur. Obscheikhim., vol. 32 (1962), pp. 3323–3331.

*Primary Examiner*—Alex Mazel
*Assistant Examiner*—R. J. Gallagher
*Attorney*—Connolly and Hutz ABSTRACT: Substituted 2-amino-3,4-dihydroquinazoline-4-one and substituted 2-amino-4-(3H)-quinazolinethionone and their utility as antihypertensive agents.

CERTAIN 2-AMINO-3,4-DIHYDROGEN-INAZOLIN-4-ONES AND 4-THIONES

This is a continuation of application Ser. No. 576,549, filed Sept. 1, 1966, which application is in turn a continuation-in-part of application Ser. No. 442,205, filed Mar. 23, 1965, both of which are now abandoned.

This invention relates to certain novel organic nitrogen compounds. More particularly, it is concerned with various new and useful organic nitrogen heterocycles having an amphoteric character and with the salts which such compounds form with pharmacologically acceptable acids and bases.

The amphoteric compounds which are included within the purview of this invention are selected from the group consisting of those of the formula:

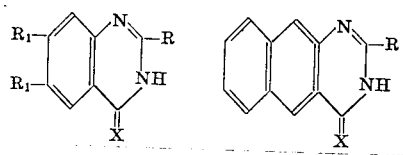

wherein $R_1$ is selected from the group consisting of methoxy, ethoxy and methyl; R is a member selected from the group consisting of N,N-dimethylamino, N,N-diethylamino, N,N-diallylamino, N-homopiperidino, N,N-di($\beta$-hydroxethyl) N-ethyl-N-allylamino, N,N'-methylpiperazino, N,N'-(n-propyl)piperazino, N,N'-allylpiperazino, N-monoisopropylamino, N-mono($\beta$-hydroxyethyl)amino and N,N'-2-furoylpiperazino; X is selected from the group consisting of oxygen and sulfur;

and, 2-(N,N-dimethylamine)-7-methoxy-3,4-dihydroquinazoline-4-one 2-(N,N-diethylamino)-7-methoxy-3,4-dihydroquinazoline-4-one 2-(N,N-dimethylamino)-7-methoxy-4-(3H)-quinazolinethione 2-(N,N-diethylamino)-7-methoxy-4-(3H)-quinazolinethione and the salts thereof with pharmacologically-acceptable acids and bases.

Typical of the specific members of the 2-amino-3,4-dihydroquinazolines-4-one series are such compounds as 2-(N,N-dimethylamino)-6,7-dimethoxy-3,4-dihydroquinazoline-4-one, 2-(N,N-diethylamino)-6,7-dimethoxy-3,4-dihydroquinazoline-4-one, 2[N-(N'-methylpiperazino)]-6,7-dimethoxy-3,4-dihydroquinazoline-4-one and the like. Specific examples of the 2-amino-4(3H)-quinazolinethione series include: 2-(N,N-diethylamino)-6,7-dimethoxy-4-(3H)-quinazolinethione, 2-(N,N-dimethylamino)-6,7-dimethoxy-4 (3H)-quinazolinethione, 2(N,N-diallylamino)-6,7-dimethoxy-4(3H)-quinazolinethione, and 2-[N-(N'-methylpiperazino)]-6,7-dimethoxy-4(3H)-quinazolinethione. These particular compounds are all highly potent in their antihypertensive effects and they afford a long duration of action as well.

The process employed for preparing the novel 2-amino-3,4-dihydroquinazoline-4-one compounds of this invention involves treating the corresponding 2-halo-3,4-dihydroquinazoline-4-ones with the appropriate amine base, viz, RH where R is as previously defined. In general, it is only necessary that at least an equimolar amount of amine base be employed, but in practice one ordinarily uses an excess of same as this serves to shift the reaction to completion. In addition, the excess amine can also function as a solvent for the reaction. A preferred excess for these purposes would be from about 2 to about 10 moles of amine to 1 mole of the 2-halo-3,4-dihydroquinazoline-4-one. If a reaction-inert solvent is employed for the reaction, one would ordinarily use a polar organic solvent such as a lower alkanol like methanol, ethanol and isopropanol, etc., or an aromatic hydrocarbon solvent such as benzene, toluene, xylene, and so forth. The temperature at which this reaction can be conducted varies within the range of from between about 50° C. up to about 200° C. for a period of from about 1 to 12 hours. A preferred reaction temperature and time for this reaction would be about 120–150° C. for about 2–4 hours. In the case where a solvent was used or when the boiling point of the amine was below the desired reaction temperature, a pressure bottle was ordinarily employed as the proper reaction vessel. Upon completion of the reaction, the product is recovered by conventional methods. For instance, evaporation of the reaction mixture to dryness affords a crude solid residual material, which can then be either triturated with water or precipitated from dilute aqueous acid in crystalline form and subsequently recrystallized from any number of appropriate organic solvents, including the N,N-dialkyl lower alkanoamides like dimethylformamide and dimethylacetamide or the lower alkanols such as ethanol and isopropanol.

The starting materials necessary for the reaction procedure of this invention, viz, the 2-halo-3,4-dihydroquinazoline-4-ones and preferably, the 2-chloro and 2-bromo compounds, are obtained by treating the corresponding 2,4-dihaloquinazolines with a strong base compound such as an alkali metal hydroxide in an aqueous reaction medium which may also contain an organic solvent as well. A molar excess of base is generally employed, while preferred organic solvents for these purposes include water-miscible inert polar organic solvents like tetrahydrofuran, dioxane and the N,N-dialkyl lower alkanoamides, such as dimethylacetamide and dimethylformamide, etc. The 2,4-dihaloquinazolines, on the other hand, are all obtained by using essentially known methods. For instance, 2,4-dichloro-6,7-dimethoxyquinazoline has been prepared according to the procedure described by F. H. S. Curd et al. in the *Journal of the Chemical Society* (London), 1948, p. 1759. This procedure is equally applicable to the other starting 2,4-dihaloquinazolines as well, i.e., as regards their method of preparation.

The 2-amino-3,4-dihydroquinazoline-4-ones in addition to being valuable antihypertensives per se, advantageously serve as useful starting materials in the preparation of the herein disclosed 2-amino-4(3H)-quinazolinethiones. This conversion is a two step sequence which proceeds through an intermediate 4-chloro derivative. Schematically, the reaction sequence is as follows:

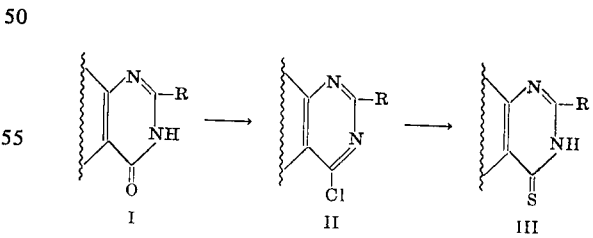

The 2-amino-3,4-dihydroquinazoline-4-one (I) as the hydrochloride salt is mixed with an excess (molewise) of phosphorus oxychloride and the resulting mixture is refluxed for a period of from one-half to 24 hours and then evaporated almost to dryness. The material which crystallizes on standing is the hydrochloride salt of the corresponding 2-amino-4-chloroquinazoline. This intermediate is converted to its free base and isolated by dissolving it in aqueous sodium bicarbonate and extracting with an organic solvent which is immiscible with water, for example, chloroform, separating the organic phase and evaporating to dryness. The residue product crystallizes on standing.

The second and final step consists of dissolving the intermediate 4-chloro derivative in tetrahydrofuran, adding thereto a slight excess of a sodium hydrogen sulfide aqueous solution followed by the addition of a catalytic amount of 1N HCl. If the chloro derivative is utilized in the form of an acid addition salt, no HCl is necessary. The resulting solution is stirred for about 1-3 hours, evaporated, and triturated with hot chloroform. Isolation by evaporation and recrystallization from methanol affords the desired 2-amino-4(3H)-quinazolinethione in good yields.

Inasmuch as the 2-amino-3,4-dihydroquinazoline-4-ones and 2-amino-4(3H)-quinazolinethiones of this invention are amphoteric compounds, they are capable of forming a wide variety of salts with various acids and bases, and particularly with the strong acids and bases in view of the nature of the compounds undergoing such a reaction. Some of these salts are pharmaceutically acceptable to begin with, whereas others must first be converted back to the free amphoteric compound and then subsequently converted to the desired salt which is fit for oral human consumption. This is done by simply treating the amphoteric compound with at least a substantially equimolar amount of the chosen acid or base in an aqueous solution or in an organic solvent such as methanol or ethanol. The solid salt is then obtained upon evaporation of the solvent, and this usually occurs in the form of a crystalline residue.

Among the various acids which can be used to prepare the pharmaceutically acceptable acid addition salts of this invention in the manner just described are those which contain pharmacologically acceptable anions such as, for example, hydrochloric acid, hydrobromic acid, nitric acid, sulfuric acid, phosphoric acid, acetic acid, lactic acid, citric acid, tartaric acid, oxalic acid, benzoic acid, succinic acid, maleic acid, methanesulfonic acid, ethanesulfonic acid, benzenesulfonic acid and p-toluenesulfonic acid and so on. The bases which can be used include those which form nontoxic salts with these compounds in view of their possession of a pharmacologically acceptable cation. As a result, such bases will generally include the alkali metal and alkaline-earth metal hydroxides like sodium, potassium, calcium and magnesium hydroxide, for example.

As previously indicated, the compounds of the present invention are all readily adapted to therapeutic use as antihypertensive agents in view of their ability to lower the blood pressure of the correspondingly agitated subjects. For example, 2-(N,N-diethylamino)-6,7-dimethoxy-3,4-dihydroquinazoline-4-one and 2-(N,N-diethylamino)-6,7-dimethoxy-4(3H)-quinazolinethione have been found to produce a definite antihypertensive response in lowering the blood pressure of hypertensive rats and dogs to a statistically significant degree when orally administered to them. Additionally, these particular compounds accomplish this result without causing any unwanted side effects to occur in the subject being so treated. As a matter of fact, no problems of toxicity or any other untoward side effects have ever been encountered with the compounds of this invention when they are administered either orally or parenterally to hypertensive subject.

In accordance with a method of treatment of the present invention, the herein described antihypertensives can be administered to an agitated subject via the oral or parenteral routes. In general, these compounds are most desirably administered in doses ranging from about 10 mg. up to 900 mg. per day, although variations will necessarily occur depending upon the weight of the subject being treated and the particular route of administration chosen. However, a dosage level, that is, in the range of from about 0.15 mg. to about 15 mg. per kg. of body weight per day is most desirably employed in order to achieve effective results. Nevertheless, it is to be appreciated that still other variations may also occur in this respect, depending upon the species of animal being treated and its individual response to said medicament, as well as on the particular type of pharmaceutical formulation chosen and the time period and interval at which such administration is carried out. In some instances, dosage levels below the lower limit of the aforesaid range may be more than adequate, while in other cases still larger dosages may be employed without causing any harmful or deleterious side effects to occur provided that such higher dose levels are first divided into several smaller doses that are to be administered throughout the day.

In connection with the use of the compounds of this invention for the treatment of agitated subjects, it is to be noted that they may be administered either alone or in combination with pharmaceutically acceptable carriers by either of the routes previously indicated, and that such administration can be carried out in both single and multiple dosages. More particularly, the novel compounds of this invention can be administered in a wide variety of different dosage forms, i.e., they may be combined with various pharmaceutically acceptable inert carriers in the form of tablets, capsules, lozenges, troches, hard candies, powders, sprays, aqueous suspensions, injectable solutions, elixirs, syrups, and the like. Such carriers include solid diluents or fillers, sterile aqueous media and various nontoxic organic solvents, etc. Moreover, such oral pharmaceutical compositions can be suitably sweetened and/or flavored by means of various agents of the type commonly employed for just such a purpose. In general, the therapeutically-effective compounds of this invention are present in such dosage forms at concentration level ranging from about 0.5 percent to about 90 percent by weight of the total composition, i.e., in amounts which are sufficient to provide the desired unit dosage previously indicated.

For purposes of oral administration, tablets containing various expedients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tableting purposes. Solid compositions of a similar type may also be employed as fillers in soft and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening or flavoring agents, coloring matter or dyes and, if so desired, emulsifying and/or suspending agents, together with such diluents as water, ethanol, propylene glycol, glycerin and various like combinations thereof.

For purposes of parenteral administration, solutions of these particular compounds in sesame or peanut oil or in aqueous-propylene glycol or in N,N-dimethylformamide may be employed, as well as sterile aqueous solutions of the corresponding water-soluble, nontoxic salts previously enumerated. Such aqueous solutions should be suitably buffered if necessary and the liquid diluent first rendered isotonic with sufficient saline or glucose. These particular aqueous solutions are especially suitable for intravenous, intramuscular and intraperitoneal injection purposes. In this connection, the sterile aqueous media employed are readily obtained by standard techniques well known to those in the art. For instance, distilled water is ordinarily used as the liquid diluent and the final preparation is passed through a suitable bacterial filter, such as a sintered-glass or a diatomaceous-earth or unglazed porcelain filter. Preferred filters of this type include the Berkefeld, the Chamberland, and the asbestos disc-metal Seitz filter, wherein the fluid is sucked through the filter candle into a sterile container with the aid of a suction pump. Needless to say, the necessary steps should be taken throughout the preparation of these injectable solutions to ensure that the final products are obtained in a sterile condition.

This invention is further illustrated by the following examples, which are not to be construed in any way or manner as imposing limitations upon the scope thereof. On the contrary, it is to be clearly understood that resort may be had to various other embodiments, modifications and equivalents thereof

EXAMPLE I

2-Chloro-6,7-Pimethoxy-3.4-Dihydroquinazoline-4-one

A mixture was prepared consisting essentially of 129 g. of 2,4-dichloro-6,7-dimethoxyquinazoline [prepared according to the method of F. H. S. Curd et al., *J. Chem. Soc.*, p. 1759 (1948)]suspended in 3 liters of 1N aqueous sodium hydroxide and one liter of tetrahydrofuran. This mixture was stirred for approximately 2½ hours at room temperature before complete solution occurred. Subsequent acidification with glacial acetic acid then afforded a crystalline precipitate, which was filtered and washed with successive portions of water, benzene and methanol. After drying to constant weight, there was obtained 115 g. (97%) of desired product, viz, 2-chloro-6,7-dimethoxy-3,4-dihydroquinazoline-4-one melting at 267°–270° C. (decomp.).

Anal. Calcd. for $C_{10}H_9N_2O_3Cl$: C, 49.90; H, 3.80; N, 11.64; Cl, 14.73.

Found: C, 49.99; H, 3.98; N, 11.56; Cl, 14.43.

EXAMPLE II

The procedure described in Example I is repeated to prepare various other 2-halo-3,4-dihydroquinazoline-4-ones of the following formula (where Y is halogen), starting from the appropriate 2,4-dihaloquinazoline compounds:

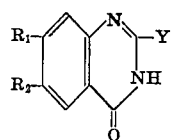

| $R_1$ | $R_2$ | Y |
|---|---|---|
| $CH_3$ | $CH_3$ | Br |
| $CH_3O$ | $CH_3O$ | Cl |
| $CH_3O$ | $CH_3O$ | Br |
| $C_2H_5O$ | $C_2H_5O$ | Cl |
| $C_2H_5O$ | $C_2H_5O$ | Br |
| H | $CH_3O$ | Cl |
| H | $CH_3O$ | Br |

Similarly, when $R_1$ and $R_2$ taken together are benzo, the procedure of Example I is followed to prepare the corresponding compounds starting from the appropriate 2,4-dihaloquinazoline compounds:

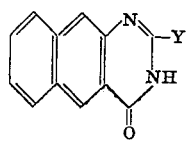

Y=Cl or Br

Example III 2-(N,N-Diethylamino)-6,7-Dimethoxy-3,4-Dihydroquinazoline-4-one

A mixture of 4.8 g. (0.03 mole) of 2-chloro-6,7-dimethoxy-3,4-dihydroquinazoline-4-one and 10 ml. of diethylamine (7.1 g., 0.0973 mole) in 50 ml. of ethanol was placed in a pressure bottle and shaken at 130° C. for 3 hours. The reaction mixture was then cooled to room temperature, the solvent removed by means of evaporation under reduced pressure and the residual material triturated with water. The solid product so obtained was then collected by means of suction filtration and recrystallized once from ethyl alcohol to afford a 70% yield of 2-(N,N-diethylamino)-6,7-dimethoxy-3,4-dihydroquinazoline-4-one, m.p. 215°–217° C.

Anal. Calcd. for $C_{14}H_{19}N_3O_3$: C, 60.63; H, 6.91; N, 15.15.

Found: C, 60.39; H, 6.67; N, 15.36.

EXAMPLE IV 2-(N,N-Dimethylamino)-6,7-Dimethoxy-3,4-Dihydroquinazoline-4-one

A mixture of 4.89 g. (0.03 mole) of 2-chloro-6,7-dimethoxy-3,4-dihydroquinazoline-4-one and 4.5 g. (0.10 mole) of dimethylamine in 50 ml. of ethanol is treated in exactly the same manner as described before in the reaction procedure for Example III. In this particular case, it was found that 2-(N,N-dimethylamino)-6,7-dimethoxy-3,4-dihydroquinazoline-4-one was the product obtained (m.p. 246°–248° C.).

Anal. Calcd. for $C_{12}H_{15}N_3O_3$: C, 57.82; H, 6.07; N, 16.86.

Found: C, 57.52; H, 5.92; N, 16.68.

EXAMPLE V 2-(N,N-Diallylamino)-6,7-Dimethoxy-3,4-Dihydroquinazoline-4-one

The procedure described in example III was followed except that diallylamine (9.7 g., 0.10 mole) was the organic base employed instead of diethylamine. In this particular case, the product obtained was 2-(N,N-diallylamino)-6,7-dimethoxy-3,4-dihydroquinazoline-4-one, m.p. 190°–191° C.

Anal. Calcd. for $C_{16}H_{19}N_3O_3$: C, 63.77; H, 6.36; N, 13.95.

Found: C, 63.58; H, 6.10; N, 13.77.

EXAMPLE VI

2-[N-(N'-Methylpiperazino)]-6,7-Dimethoxy-3,4-Dihydroquinazoline-4-one

The procedure described in example III was followed except that N-methylpiperazine (10 g., 0.10 mole) was the organic base employed instead of diethylamine. In this particular case, the product obtained was 2-[N-(N-40 -methylpiperazino)]-6,7-dimethoxy-3,4-dihydroquinazoline-4-one, m.p. 250°–252° C.

Anal. Calcd. for $C_{15}H_{20}N_4O_3$: C, 59.19; H, 6.62; N, 18.41.

Found: C, 59.47; H, 6.60; N, 18.29.

EXAMPLE VII 2-(N-Homopiperidino)-6,7-Dimethoxy-3,4-Dihydroquinazoline-4-one

The procedure described in example III was followed except that N-homopiperidine (0.10 mole) was the organic base employed instead of diethylamine. The product is obtained in good yields, m.p. 253°–255° C.

EXAMPLE VIII

2-λN-(N'-n-propylpiperazino)]-6,7-Dimethoxy-3,4-Dihydroquinazoline-4-one

The procedure described in example III was followed except that N-n-propylpiperazine (0.10 mole) was the organic base employed instead of diethylamine. The product is obtained in good yields, m.p. 223°–225° C.

EXAMPLE IX

2-[N-(N'-Allylpiperazino)]-6,7-Dimethoxy-3,4-Dihydroquinazoline-4-one

The procedure described in example III was followed except that N-allylpiperazine (0.10 mole) was the organic base employed instead of diethylamine. The product is obtained in good yields, m.p. 219°–200° C.

EXAMPLE IXA

2-[N-(N'-2-Furoylpiperazino)]-6,7-Dimethoxy-3,4-Dihydroquinazoline-4-one

The procedure described in example III was followed except that N-2-furoylpiperazine (0.10 mole) was the organic base employed instead of diethylamine. The product is obtained in good yields, m.p. 283°–286° C.

EXAMPLE X

The procedure of example III is again employed to prepare the following compounds, which are listed below in the table of this example, starting from the appropriate 2-halo-3,4-dihydroquinazoline-4-one (of examples I–II) and the corresponding amines:

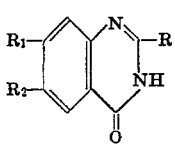

| $R_1$ | $R_2$ | R |
|---|---|---|
| CH₃O | CH₃O | N(CH₂CH₂OH)₂ |
| CH₃O | CH₃O | N(C₂H₅)CH₂CH=CH₂ |
| CH₃O | CH₃O | NHCH(CH₃)₂ |
| CH₃O | CH₃O | NHCH₂CH₂OH |
| C₂H₅O | C₂H₅O | H(CH₃)₂ |
| C₂H₅O | C₂H₅O | N(C₂H₅)₂ |
| C₂H₅O | C₂H₅O | N(CH₂CH=CH₂)₂ |
| C₂H₅O | C₂H₅O | N⌬N—CH₃ |
| C₂H₅O | C₂H₅O | N⌬N—n-propyl |
| C₂H₅O | C₂H₅O | N⌬N—CH₂—CH=CH₂ |
| CH₃ | CH₃ | N(CH₃)₂ |
| CH₃ | CH₃ | N(C₂H₅)₂ |
| CH₃ | CH₃ | N-homopiperidino |
| CH₃ | CH₃ | N(C₂H₅)CH₂CH=CH₂ |
| CH₃ | CH₃ | NHCH₂CH₂OH |
| CH₃ | CH₃ | N(CH₂CH₂OH)₂ |
| H | CH₃O | N(CH₃)₂ |
| H | CH₃O | N(C₂H₅)₂ |
| | Benzo | N(CH₃)₂ |
| | Benzo | N(C₂H₅)₂ |
| | Benzo | N(CH₂CH=CH₂)₂ |
| | Benzo | N-homopiperidino |
| | Benzo | N(CH₂CH₂OH)₂ |
| | Benzo | N(C₂H₅)CH₂CH=CH₂ |
| | Benzo | N⌬N—CH₃ |
| | Benzo | N⌬N—n-propyl |
| | Benzo | N⌬N—CH₂CH=CH₂ |
| | Benzo | NHCH(CH₃)₂ |
| | Benzo | NHCH₂CH₂OH |
| | Benzo | N⌬N—C(=O)—furyl |

EXAMPLE XI 2-(N,N-Diethylamino)-6,7-Dimethoxy-4(3H)-Quinazolinethione

A. A mixture of 2-(N,N-diethylamino)-6,7-dimethoxy-3,4-dihydroquinazoline-4-one (10 g.) as prepared in example III as its hydrochloride salt in 50 ml. of phosphorus oxychloride is refluxed for 2 hours, after which, the mixture is evaporated almost to dryness to yield crystalline 2-(N,N-diethylamino)-4-chloro-6,7-dimethoxyquinazoline hydrochloride, m.p. 175°–184° C. This product is dissolved in dilute sodium bicarbonate solution, extracted with chloroform, separated for the dried organic phase evaporated to give the 4-chloro product as the free base in 82% yield, m.p. 129°–131° C.

Anal. Calc'd. for $C_{14}H_{18}O_2N_3Cl$. C, 56.86; H, 6.13; N, 14.21; Found: C, 56.81; H, 6.08; N, 13.97

B. To 7.6 g. of the above obtained intermediate product, 2-(N,N-diethylamino)-4-chloro-6,7-dimethoxyquinazoline, in 100 ml. of tetrahydrofuran is added a solution of 3.8 g. of sodium hydrogen sulfide hydrate in 30 ml. of water, followed by the addition of 25 ml. of 1N HCl. The resulting solution is stirred for 1 hour at room temperature and then evaporated to a solid residue which is triturated with 150 ml. of hot chloroform and the insolubles are filtered. The filtrate is concentrated to a small volume, isopropyl ether added, and the resulting precipitate is collected. Recrystallization from methanol provided 3.9 g. (51%) of desired product, m.p. 154°–157° C.

Anal. Calc'd. for $C_{14}H_{19}N_3O_2S$: C, 57.31; H, 6.53; N, 14.32; S, 10.93
Found: C, 57.54; H, 6.52; N, 14.34; S, 11.05

EXAMPLE XII 2-(N,N-Dimethylamino)-6,7-Dimethoxy-4(3H)-Quinazolinethione

The procedure of example XI (step A) is repeated wherein a stoichiometric equivalent amount of 2-(N,N-dimethylamino)-6,7-dimethoxy-3,4-dihydroquinazoline-4-one as prepared by the method of example IV is used (as its hydrochloride salt) in lieu of 2-(N,N-diethylamino)-6,7-dimethoxy-3,4-dihydroquinazoline-4-one and good yields of 2-(N,N-dimethylamino)-4-chloro-6,7-dimethoxy-3,4-dihydroquinazoline are obtained. This intermediate product is used following the procedure of example XI (step B) in place of 2-(N,N-diethylamino)-4-chloro-6,7-dimethoxyquinazoline (in stoichiometric equivalent amounts) and substantial yield of product is obtained.

EXAMPLE XIII 2-(N,N-Diallylamino)-6,7-Dimethoxy-4(3H)-Quinazolinethione

The procedure of example XI (step A) is repeated wherein a stoichiometric equivalent amount of 2-(N,N-diallylamino)-6,7-diethoxy-3,4-dihydroquinazoline-4-one as prepared by the method of example V is used (as its hydrochloride salt) in lieu of 2-(N,N-diethylamino)-6,7-dimethoxy-3,4-dihydroquinazoline-4-one and good yields of 2-(N,N-diallylamino)-4-chloro-6,7-dimethoxyquinazoline are obtained. This intermediate product is used following the procedure of example XI (step B) in place of 2-(N,N-diethylamino)-4-chloro-6,7-dimethoxyquinazoline in stoichiometric equivalent amounts) and substantial yield of product is obtained.

EXAMPLE XIV 2-[N-(N'-Methylpiperazino)]-6,7-Dimethoxy-4(3H)-Quinazolinethione The procedure of example XI (step A) is repeated wherein a stoichiometric equivalent amount of 2-[N-(N'-methylpiperazino)]-6,7-dimethoxy-3,4-dihydroquinazoline-4-one as prepared by the method of example VI is used (as its hydrochloride salt) in lieu of 2-(N,N-diethylamino)-6,7-dimethoxy-3,4-dihydroquinazoline-4-one and good yields of 2-[N-(N'-methylpiperazino)]-4-chloro-6,7-dimethoxyquinazoline are obtained. This intermediate product is used following the procedure of example XI (step B) in place of 2-(N,N-diethylamino)-4-chloro-6,7-dimethoxyquinazoline (in stoichiometric equivalent amounts) and substantial yield of product is obtained.

EXAMPLE XV 2-(N-Homopiperidino)-6,7-Dimethoxy-4(3H)-Quinazolinethione

The procedure of example XI (step A) is repeated wherein a stoichiometric equivalent amount of 2-(N-homopiperidino)-6,7-dimethoxy-3,4-dihydroquinazoline-4-one as prepared by the method of example VII is used (as its hydrochloride salt) in lieu of 2-(N,N-diethylamino)-6,7-dimethoxy-3,4-dihydroquinazoline-4-one and good yields of 2-(N-homopiperidino)-4-chloro-6,7-dimethoxyquinazoline are obtained. This intermediate product is used following the procedure of example XI (step B) in place of 2-(N,N-diethylamino)-4-chloro-6,7-dimethoxyquinazoline (in stoichiometric equivalent amounts) and substantial yield of product is obtained.

EXAMPLE XVI

2-[N-(N'-n-Propylipiperazino)]-6,7-Dimethoxy-4(3H)-Quinazolinethione

The procedure of example XI (step A) is repeated wherein a stoichiometric equivalent amount of 2-[N-(N'-n-propylpiperazino)]-6,7-dimethoxy-3,4-dihydroquinazoline-4-one as prepared by the method of example VIII is used (as its hydrochloride salt) in lieu of 2-(N,N-diethylamino)-6,7-dimethoxy-3,4-dihydroquinazoline-4-one and good yields of 2-[N-(N'- n-propylpiperazino)]-4-chloro-6,7-dimethoxyquinazoline are obtained. This intermediate product is used following the procedure of example XI (step B) in place of 2-(N,N-diethylamino)-4-chloro-6,7-dimethoxyquinazoline (in stoichiometric equivalent amounts) and substantial yield of product is obtained.

EXAMPLE XVII

2-[N-(N'-Allylpiperazino)]-6,7-Dimethoxy-4(3H)Quinazolinethione

The procedure of example XI (step A) is repeated wherein a stoichiometric equivalent amount of 2-[N-(N'-allylpiperazino)]-6,7-dimethoxy-3,4-dihydroquinazoline-4-one as prepared by the method of example IX is used (as its hydrochloride salt) in lieu of 2-(N,N-diethylamino)-6,7-dimethoxy-3,4-dihydroquinazoline-4-one and good yields of 2-[N-(N'-allylpiperazino)]-4-chloro-6,7-dimethoxyquinazoline are obtained. This intermediate product is used following the procedure of example XI (step B) in place of 2-(N,N-diethylamino)-4-chloro-6,7-dimethoxyquinazoline (in stoichiometric equivalent amounts) and substantial yield of product is obtained.

EXAMPLE XVIIA

2-[N-(N'-2-Furoylpiperazino)]-6,7-Dimethoxy-4(3H)-Quinazolinethione

The procedure of example XI (steps A and B) is repeated wherein 2-[N-(N'-2-furoylpiperazino)]-6,7-dimethoxy-3,4-dihydroquinazoline-4-one as prepared by example IXA is used (as its hydrochloride salt) in lieu of 2-(N,N-diethylamino)-6,7-dimethoxy-3,4-dihydroquinazoline-4-one and substantial yield of product is obtained.

EXAMPLE XVIII

The procedure of example XI (steps A and B) is repeated to prepare the quinazolinethiones corresponding to the quinazoline-4-ones listed in example X wherein the intermediate 4-chloro compounds are isolated and then converted to the desired products. The same molar basis of reagents is used and good yields are obtained in each instance.

EXAMPLE XIX

The hydrochloride salt of 2-(N,N-diethylamino)-6,7-dimethoxy-3,4-dihydroquinazoline-4-one was prepared by dissolving the compound in an aqueous solution containing an equivalent amount in moles of hydrochloric acid. Actually, aqueous 1N HCl was used for these purposes. Upon completion of this step, the resultant solution was then evaporated to dryness while under reduced pressure to afford the desired salt in the form of a crystalline residue. In this manner, there was obtained 2-(N,N-diethylamino)-6,7-dimethoxy-3,4-dihydroquinazoline-4-one hydrochloride, m.p. 250°–251°C.

Anal. Calcd. for $C_{14}H_{19}N_3O_3 \cdot HCl$: C, 53.59; H, 6.42; N, 13.37

Found: C, 53.73; H, 6.54; N, 13.49

EXAMPLE XX

The procedure described in example XIX is repeated to prepare other hydrochlorides, which are listed below in the table together with their melting points. In each case, elementary analysis for carbon, hydrogen, nitrogen and chlorine agrees with the calculated values.

2-(N,N-dimethylamino)-6,7-dimethoxy-3,4-dihydroquinazoline-4-one hydrochloride, m.p. 279°–282° 279–C.

2-(N,N-diallylamino)-6,7-dimethoxy-3,4-dihydroquinazoline-4-one hydrochloride, m.p. 233–235°C.

2-(N-homopiperidino)-6,7-dimethoxy-3,4-dihydroquinazoline-4-one hydrochloride, m.p. 244–245°C.

2-[N-(N'-methylpiperazino)]-6,7-dimethoxy-3,4-dihydroquinazoline-4-one hydrochloride, m.p. 242°–245°C.

EXAMPLE XXI

The procedure described in example XIX is repeated to prepare the hydrochloride of 2-(N,N-diethylamino)-6,7-dimethoxy-4(3H)-quinazolinethione, m.p. 192–200°C.

EXAMPLE XXII

The procedure described in example XIX is repeated to prepare the hydrochlorides of those quinazolinethiones cited in examples XII, XIII, XIV, XV, XVI, XVIIA and XVIII and substantial yield of product is obtained in each instance.

EXAMPLE XXIII

The other acid addition salts of the novel 2-amino-3,4-dihydroquinazoline-4-ones and 2-amino-4(3H)-quinazolinethiones of this invention, like 2-(N,N-diethylamino)-6,7-dimethoxy-3,4-dihydroquinazoline-4-one hydrobromide, and 2-(N,N-diethylamino)-6,7-dimethoxy-4-(3H)-quinazolinethione hydrobromide, are prepared by the same general procedure described in example XIX, except that in the case of the hydrobromide, hydroiodide, nitrate, sulfate or bisulfate, phosphate or acid phosphate, methanesulfonate, ethanesulfonate, benzenesulfonate and p-toluenesulfonate salts, the corresponding appropriate organic or mineral acid is employed in place of hydrochloric acid, with comparable results being obtained in each instance.

In like manner, ethanol can be substituted for water in this very same procedure with comparable results also being obtained. For instance, when the respective acid and 2-(N,N-diethylamino)-6,7-dimethoxy-3,4-dihydroquinazoline-4-one are both separately dissolved in ethanol and the two solutions are then mixed, followed by the addition of diethyl ether to the resulting reaction mixture, there is obtained the desired acid addition salt in the form of a crystalline precipitate from said solution. This method has also been used to prepare the corresponding acetate, lactate, citrate or acid citrate, tartrate or bitartrate, oxalate, benzoate, succinate and maleate salts of the 2-amino-3,4-dihydroquinazoline-4-one and 2-amino-4(3H)-quinazolinethione compounds of this invention as well.

EXAMPLE XXIV

The sodium salt of 2-(N,N-diethylamino)-6,7-dimethoxy-3,4-dihydroquinazoline-4-one and 2-(N,N-diethylamino)-6,7-dimethoxy-4(3H)-quinazolinethione are prepared by dissolving the compound in water, i.e., in an aqueous solution containing a sufficient amount of sodium hydroxide to be equimolar with respect to the amphoteric organic base. Upon freeze-drying of the mixture, the desired alkali metal salt is obtained.

EXAMPLE XXV

The potassium salt of 2-(N,N-dimethylamino)-6,7-dimethoxy-3,4-dihydroquinazoline-4-one and 2-(N,N-dimethylamino)-6,7-dimethoxy-4(3H)-quinazolinethione are prepared by dissolving the compound in an aqueous solution containing an equivalent amount in moles of potassium hydroxide. The resultant solution is then concentrated under reduced pressure to obtain the desired potassium salt.

EXAMPLE XXVI

Other alkali metal and alkaline-earth metal salts of the novel 2-amino-3,4-dihydroquinazoline-4-ones and 2-amino-4(3H)-quinazolinethiones of this invention are prepared according to the general procedure of the preceding two examples by merely substituting the appropriate amphoteric organic base and alkali or alkaline-earth metal reagent, as the case may be, to obtain the desired results. For instance, 2-(N,N-diallylamino)-6,7-dimethoxy-3,4-dihydroquinazoline-4-one and calcium hydroxide react in this manner to afford the corresponding calcium salt.

In like manner, the corresponding lithium, sodium, potassium, calcium, barium, strontium and magnesium salts of all these compounds are also obtained.

EXAMPLE XXVII

The following pharmacological evaluation was carried out to determine the antihypertensive activity of the novel compounds cited below in dogs made hypertensive by the procedure of Goldblatt et al. *J. Exp. Med.* 59, 347 (1934). Doses of 2.5 and 10.0 mg./kg. were administered orally in capsules on consecutive days in the form of hydrochloride salts. The systolic pressure was determined on the coccygeal artery according to the method of Prioli and Wenbury, *J. App. Physiol.* 15, 323 (1960), prior to drug administration and 2, 4 and 24 hours thereafter. Heart rates were determined from the simultaneously record ECG. Two dogs were used for evaluation of each compound. An average blood decrease of less than 10 mm. Hg. was assigned a score of 0; decreases of 10 to 20, 20 to 35 and 35 to 60 mm. Hg. were scored +++ and +++, respectively.

| Compound | Activity at (mg./kg.)— | |
|---|---|---|
| | 2.5 | 10.0 |
| 2-(N, N-diethylamino)-6, 7-dimethoxy-3, 4-dihydroquinazoline-4-one | + | +++ |
| 2-(N, N-dimethylamino)-6, 7-dimethoxy-3, 4-dihydroquinazoline-4-one | 0 | ++ |
| 2-(N-ethyl-N-allylamino)-6, 7-dimethoxy-3, 4-dihydroquinazoline-4-one | 0 | ++ |
| 2-(N, N-diallylamino)-6, 7-dimethoxy-3, 4-dihydroquinazoline-4-one | 0 | ++ |
| 2-[N, N-di(β-hydroxyethyl)amino]-6, 7-dimethoxy-3, 4-dihydroquinazoline-4-one | 0 | + |
| 2-(N-homopiperidino)-6, 7-dimethoxy-3, 4-dihydroquinazoline-4-one | 0 | + |
| 2-[N-(N'-methylpiperazino)]-6, 7-dimethoxy-3, 4-dihydroquinazoline-4-one | 0 | ++ |
| 2-(N-monoisopropylamino)-6, 7-dimethoxy-3, 4-dihydroquinazoline-4-one | 0 | + |
| 2-[N-mono(β-hydroxyethyl)amino]-6, 7-dimethoxy-3, 4-dihydroquinazoline-4-one | 0 | + |
| 2-(N, N-diethylamino)-6, 7-diethoxy-3, 4-dihydroquinazoline-4-one | 0 | + |
| 2-(N, N-dimethylamino)-7-methoxy-3, 4-dihydroquinazoline-4-one | 0 | + |
| 2-(N, N-diethylamino)-7-methoxy-3, 4-dihydroquinazoline-4-one | 0 | ++ |
| 2-(N, N-dimethylamino)-6, 7-dimethyl-3, 4-dihydroquinazoline-4-one | 0 | ++ |
| 2-(N, N-diethylamino)-6, 7-dimethyl-3, 4-dihydroquinazoline-4-one | 0 | + |

Similar results were obtained for the corresponding 4-thione compounds.

We claim:

1. A compound selected from the group consisting of

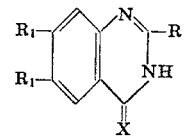

wherein $R_1$ is selected from the group consisting of methoxy and ethoxy; R is a member selected from the group consisting of N,N-dimethylamino, N,N-diethylamino, N,N-diallylamino, N-homopiperidino, N,N-di (β-hydroxyethyl)-amino, N-ethyl-N-allylamino, N,N'-methylpiperazino, N,N'(N-propyl)piperazino, N,N'-allylpiperazino, N-monoisopropylamino, N-mono (β-hydroxyethyl)amino and N,N'-2-furoylpiperazino and X is selected from the group consisting of oxygen and sulfur and the slats thereof with pharmacologically-accepted acids and bases.

2. A compound as claimed in claim 1 wherein $R_1$ is methoxy, R is N,N-diethylamino and X is oxygen.

3. A compound as claimed in claim 1 wherein $R_1$ is methoxy, R is N,N-dimethylamino and X is oxygen.

4. A compound as claimed in claim 1 wherein $R_1$ is methoxy, R is N,N-diallylamino and X is oxygen.

5. A compound as claimed in claim 1 wherein $R_1$ is methoxy, R is N,N'-methylpiperazino and X is oxygen.

6. A compound as claimed in claim 1 wherein $R_1$ is methoxy, R is N,N'-(n-prophyl)piperazino and X is oxygen.

7. A compound as claimed in claim 1 wherein $R_1$ is methoxy, R is N,N'-allylpiperazino and X is oxygen.

8. A compound as claimed in claim 1 wherein $R_1$ is methoxy, R is N-homopiperidino and X is oxygen.

9. A compound as claimed in claim 1 wherein $R_1$ is methoxy, R is N,N'-2-furoylpiperazino and X is oxygen.

10. A compound as claimed in claim 1 wherein $R_1$ is methoxy, R is N,N-diethylamino and X is sulfur.

11. A compound as claimed in claim 1 wherein $R_1$ is methoxy, R is N,N-dimethylamino and X is sulfur.

12. A compound as claimed in claim 1 wherein $R_1$ is methoxy, R is N,N-diallylamino and X is sulfur.

13. A compound as claimed in claim 1 wherein $R_1$ is methoxy, R is N,N-methylpiperazino and X is sulfur.

14. A compound as claimed in claim 1 wherein $R_1$ is methoxy, R is N,N'-(n-propyl)piperazino and X is sulfur.

15. A compound as claimed in claim 1 wherein $R_1$ is methoxy, R is N,N'-allylpiperazino and X is sulfur.

16. A compound as claimed in claim 1 wherein $R_1$ is methoxy, R is N-homopiperidino and X is sulfur.

17. A compound as claimed in claim 1 wherein $R_1$ is methoxy, R is N,N'-2-furoylpiperazino and X is sulfur.